(12) United States Patent
Fukaya et al.

(10) Patent No.: US 6,495,796 B2
(45) Date of Patent: Dec. 17, 2002

(54) HIGH DENSITY ENERGY BEAM MACHINING METHOD AND APPARATUS FOR THE SAME

(75) Inventors: Terukazu Fukaya, Nagoya (JP); Takashi Nakayama, Nagoya (JP); Sumitomo Inomata, Toyota (JP); Michio Kameyama, Toyota (JP); Seiji Tachibana, Kariya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/912,058

(22) Filed: Jul. 25, 2001

(65) Prior Publication Data

US 2002/0023905 A1 Feb. 28, 2002

(30) Foreign Application Priority Data

Jul. 27, 2000 (JP) ........................................ 2000-227246

(51) Int. Cl.[7] .............................................. B23K 26/38
(52) U.S. Cl. ................................................. 219/121.84
(58) Field of Search ..................... 219/121.18, 121.19, 219/121.2, 121.33, 121.67, 121.68, 121.69, 121.7, 121.71, 121.72, 121.84

(56) References Cited

U.S. PATENT DOCUMENTS

| 4,689,467 A | * | 8/1987 | Inoue |
| 5,948,292 A | * | 9/1999 | Tanaka et al. |
| 6,198,070 B1 | * | 3/2001 | Nakayama |

FOREIGN PATENT DOCUMENTS

JP    A-2000-225486    8/2000

* cited by examiner

*Primary Examiner*—Samuel M. Heinrich
(74) *Attorney, Agent, or Firm*—Law Offices of David G. Posz

(57) ABSTRACT

A discharging nozzle is provided in an inside space of a metal cylinder for supplying an assist gas from an inside of the metal cylinder. The gas discharging nozzle shuts a high density energy beam intruding into the inside space of the metal cylinder through a hole, so that the energy beam is prevented from being emitted to an opposite side inner surface of the metal cylinder. Dross formed during the cut-machining is drifted and swept to the outside by an assist gas flowing out from the inside space of the metal cylinder through the hole, and is blown out by the assist gas flowing on an outside surface of the metal cylinder around the hole, thereby preventing the dross from sticking to peripheral area of the hole.

19 Claims, 6 Drawing Sheets

HIGH DENSITY ENERGY BEAM MACHINING METHOD AND APPARATUS FOR THE SAME

CROSS REFERENCE TO RELATED APPLICATION

This application is based on and incorporates herein by reference Japanese Patent Application No. 2000-227246 filed on Jul. 27, 2000.

BACKGROUND OF THE INVENTION

1. Field of the Invention

The present invention relates to high density energy beam machining method and apparatus for the same in which high density energy beam is emitted to perform cut-machining.

2. Description of Related Art

Conventionally, when a work piece is cur-machined for removing unnecessary parts, forming a hole, and forming a thin groove, a high density energy beam machining method is used. In this method, a high density energy beam is emitted to a portion of the work piece, which is to be cut (cut-machined portion), for fusing and cutting the cut-machined portion. Generally, while this cut-machining is performed, assist gas such as nitrogen and oxygen is injected simultaneously with the emission of the high density energy beam for quickly removing dross and vaporized substance generated by the cut machining. In this way, the dross and vaporized substance are prevented from sticking to the work piece and a condensing lens of a work nozzle.

When the work piece is, as described above, cut-machined by blowing the assist gas from emission side of the high density energy beam, the dross D mostly flows to the lower side of the cut-machined portion due to the assist gas, and sticks to the periphery area of the cut-machined portion.

For preventing the dross from sticking, it is considered that assist gas is supplied from both the emission side of the high density energy beam and the opposite side thereof. Here, the assist gas supplied from one of them flows toward an opposite side through cut portion formed by the emission of the high density energy beam, and the assist gas supplied from the other of them flows along an inside or outside surface of the work piece.

According to the structure, when one of the assist gases flows through the cut portion and to the opposite side, the dross generated during the cut-machining is drifted and swept to the opposite side of the work piece through the cut portion. At the opposite side to which the dross is drifted and swept, the other assist gas flows along the inside or outside surface of the work piece, so that the dross drifted and swept to the opposite side is blown by the other assist gas. Thus, the dross is effectively prevented from sticking.

However, when the above described method is used for forming holes on a work piece having a hollow space thereinside, for example, when it is used for forming through holes on a cylindrical side wall of a cylindrical work piece, as shown in FIG. 9, a gas discharging nozzle 101 is disposed at one end of the cylindrical work piece 102. The high density energy beam HB is emitted from a work nozzle 103 to form a hole 104 on the work piece 102, and the assist gas supplied from the gas discharging nozzle 101 into the work piece 102 flows out to the outside through the hole 104. In this case, there arise following disadvantages.

Since the assist gas supplied from the gas discharging nozzle 101 into the work piece 102 flows out to the outside through the hole 104, the dross does not stick to an inner surface of the work piece. However, when the hole 104 is formed, the high density energy beam HB passes through the hole 104 and is emitted to the opposite side inner surface of the work piece, so that the emitted inner surface might be partially burned and melt.

When a large number of holes are formed, pressure and amount of the assist gas flowing out from the hole 4 is decreased, so that the pressure drifting and sweeping the dross is decreased. As a result, the dross tends to stick around holes being formed later.

SUMMARY OF THE INVENTION

A first object of the present invention is to prevent the high density energy beam passing through a cut portion formed by the energy beam from being emitted to an opposite side inner surface of a work piece.

A second object of the present invention is to prevent dross from sticking to the peripheral area of the cut portion.

According to the present invention, a discharging nozzle is provided in an inside space for supplying an assist gas from an inside of the work piece. The gas discharging nozzle shuts the high density energy beam intruding into the inside space of the work piece through the cut portion, so that the energy beam is prevented from being emitted to an opposite side inner surface of the work piece. The dross formed during the cut-machining is drifted and swept to the outside by an assist gas flowing out from the inside space of the work piece through the cut portion, and is blown out by the assist gas flowing on an outside surface of the work piece around the cut portion, thereby preventing the dross from sticking to peripheral area of the cut portion.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS

Figure 1:
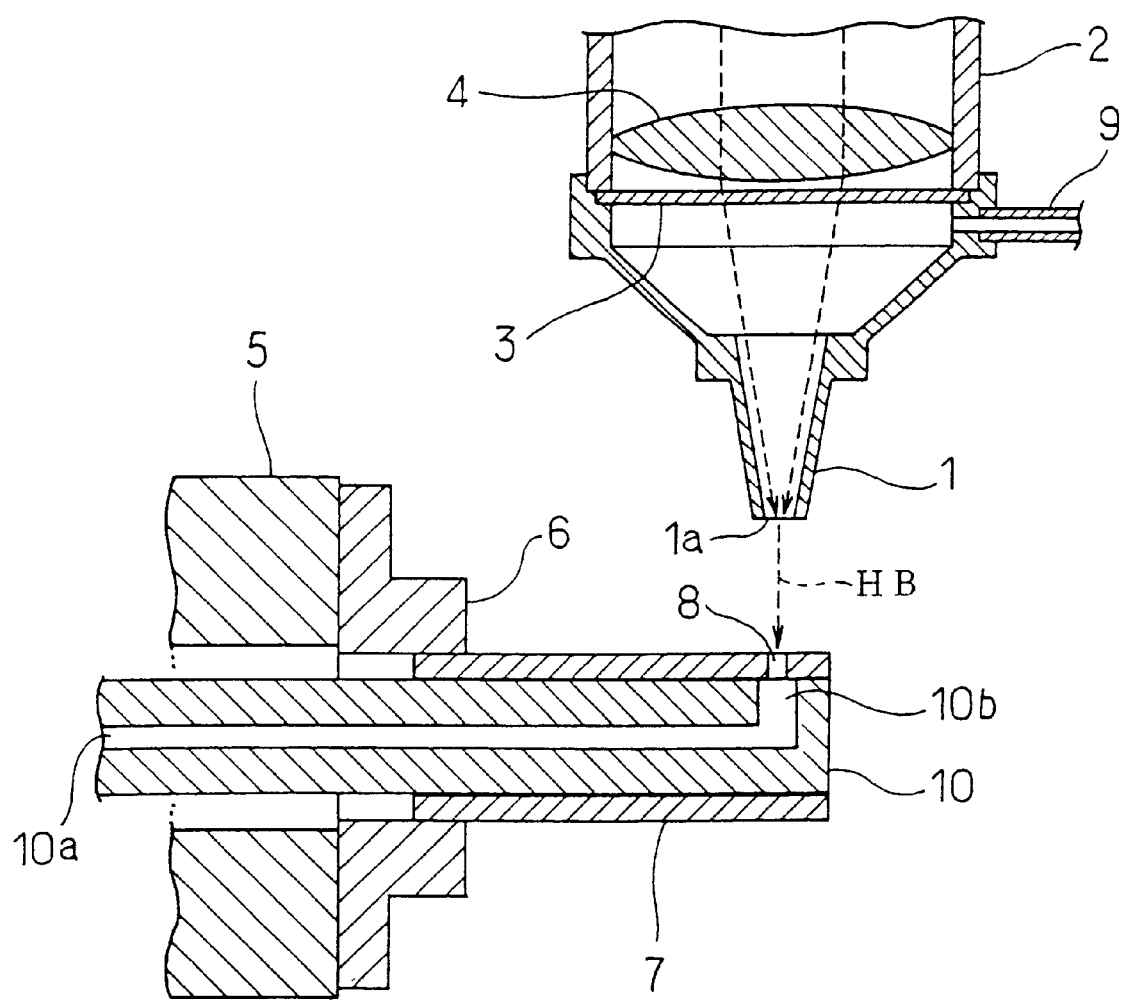
FIG. 1 is cross-sectional view showing a work nozzle, a metal cylinder and an assist gas discharging nozzle.

FIG. 1 shows a laser beam machining apparatus in the present embodiment. In the laser beam machining apparatus, a work nozzle 1 is connected to an oscillator (not illustrated) through a transmission pipe 2, and the work nozzle 1 defines an outlet port 1a. A protection glass 3 is provided above the outlet port 1a, and a condenser lens 4 is provided above the protection glass 3. High density energy beam HB projected from the oscillator changes the direction thereof at a vent mirror (not illustrated) in the transmission pipe 2, passes through the condenser lens 4 and the protection glass 3, and is emitted from the outlet port 1a toward a work piece to be machined. Here, the oscillator may generate laser, electron beam, light beam, and the like. Generally, laser is most appropriately used.

Figure 3A:
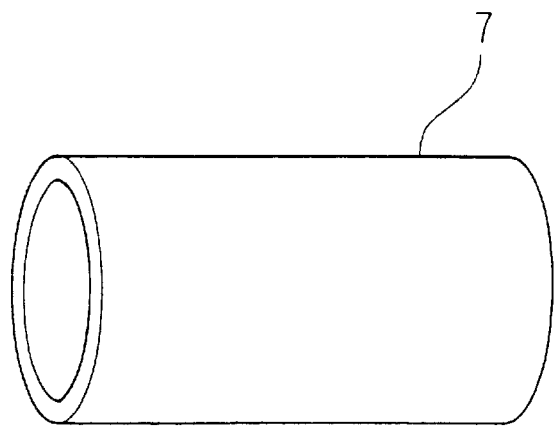
FIG. 3A is a perspective view showing the metal cylinder schematic view before forming holes.
Figure 3B:
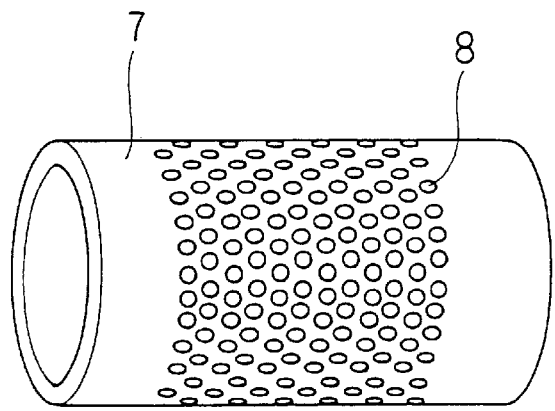
FIG. 3B is a perspective view showing the metal cylinder after the forming the holes.

A machining table (not illustrated) is provided below the work nozzle 1, and a hollow rotary head 5 is provided on the machining table. The rotary head 5 includes a chuck 6, and the chuck 6 holds the work piece. In the present embodiment, the work piece is a hollow metal cylinder 7 shown in FIG. 3A, and a plurality of circular holes 8 are formed by laser beam cutting as shown in FIG. 3B. The circular hole 8 allows the inside space of the metal cylinder 7 to communicate with the outside thereof.

The work nozzle 1 is arranged to move vertically, that is, to move in Z-axis direction. The machining table is arranged to move horizontally, that is, to move in X-Y plane. The high density energy beam HB projected from the oscillator passes through the condenser lens 4, and is focused to laser beam cutting portion of the metal cylinder 7. When the hole 8 is formed by the laser beam cutting, the work nozzle 1 and the machining table move, and the rotary head 5 rotates. Thus, the work nozzle 1 moves with respect to the metal cylinder 7 such that the high density energy beam HB is emitted along a line which is to be cut.

When forming one hole 8 is finished, the machining table to which the rotary head 5 is mounted moves horizontally, or the rotary head 5 rotates the chuck 6 by a predetermined angle, for positioning a part (laser beam cutting portion) where next hole 8 is formed to an emitting position of the high density energy beam HB.

The laser beam cutting is performed while supplying assist gas such as nitrogen or oxygen. The assist gas is supplied to the beam emitted portion from both inside and outside of the metal cylinder 7. The work nozzle 1 performs the supply of the assist gas from the outside. That is, the work nozzle 1 works as a first gas supplying means in the present invention. As shown in FIG. 1, the work nozzle 1 includes an assist gas introducing pipe 9. The assist gas introducing pipe 9 is disposed at the outlet port 1a side of the condenser lens 4. The assist gas introducing pipe 9 is connected to a gas supplying source (not illustrated).

The assist gas is supplied from the gas supplying source into the work nozzle 1 through the assist gas introducing pipe 9, and discharged from the outlet port 1a of the work nozzle 1 toward the surface of the metal cylinder 7. The assist gas collides with the metal cylinder 7 and flows along the surface of the metal cylinder 7. Here, since the work nozzle is conically formed to be tapered, most of the assist gas having collided with the surface of the metal cylinder 7 flows from the outside into the inside of the beam emitted portion.

Meanwhile, a gas discharging nozzle 10 performs the supply of the assist gas from the inside of the metal cylinder 7. That is, the gas discharging nozzle 10 works as a second gas supplying means in the present invention. The gas discharging nozzle 10 is cylindrically formed and includes a gas passage 10a thereinside. The gas discharging nozzle 10 is disposed in the hollow of the rotary head 5 concentrically with the rotation center of the rotary head 5, and the leading tip thereof protrudes from the chuck 6.

The discharging nozzle 10 includes a discharge port 1ob at the leading top surface thereof. The discharge port 1ob opens vertically and upwardly. The discharge outlet 1ob is positioned just below the work nozzle 1, and the axis thereof corresponds to the light axis of the high density energy beam HB projected from the work nozzle 1. When the metal cylinder 7 is machined, the discharging nozzle 10 is attached to the chuck 6 while inserting the leading head thereof into hollow space of the metal cylinder 7. Here, outer diameter of the gas discharging nozzle 10 is designed to be approximately the same as inner diameter of the metal cylinder 7. Thus, the gas discharging nozzle 10 is hermetically fit and contact to the inner surface of the metal cylinder 7.

For preventing dross from sticking to a periphery of the hole 8, the diameter of the discharge port 10b has to be larger than the diameter of the hole 8. However, when the diameter of the discharge port 10b is too large, the discharge port 10b overlaps the last hole 8, which has been already formed and is next to current hole 8 just being formed. In this case, amount and pressure of the assist gas flowing out of the current hole 8 are reduced, thereby reducing an effect to drift and sweep the dross. In the present embodiment, while considering the diameter of the hole 8 and pitch between each of adjacent holes 8, the diameter of the hole 8 is set to 0.3 mm, and the diameter of the discharge port 10b is set to 1.0 mm. Thus, the assist gas flows out of the current hole 8 only.

In this way, the assist gas discharged from the gas discharging nozzle 10 flows out of only one hole 8. Here, pressure of the assist gas supplied from the gas discharging nozzle 10 is set to 0.7 MPa, and the assist gas supplied from the work nozzle 1 is set to 0.4 MPa. That is, the assist gas flowing out from the inside of the metal cylinder 7 has higher pressure at the laser beam cutting portion.

An operation of the present embodiment will be explained.

For forming holes 8 on the metal cylinder 7, the chuck 6 holds the metal cylinder 7 as shown in FIG. 1. The work nozzle 1 emits the high density energy beam HB to the metal cylinder 7, and the assist gas introducing pipe 9 introduces the assist gas into the work nozzle 1. The assist gas is discharged through the inside of the work nozzle 1 and toward the beam emitted portion from the outlet port 1a. At this time, the assist gas in the gas passage 10a of the gas discharging nozzle 10 is appropriately pressurized.

Figure 2:
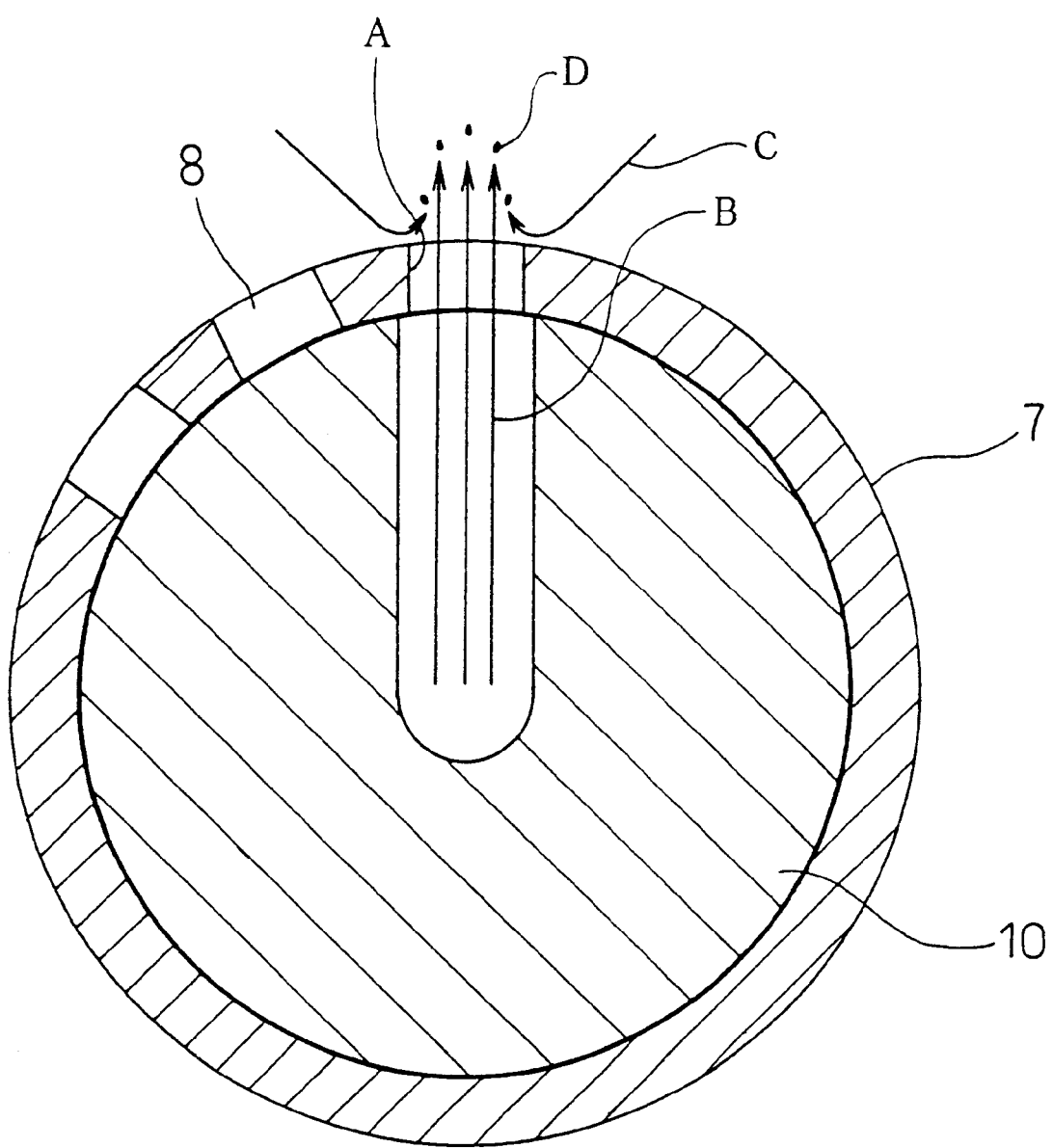
FIG. 2 is a cross-sectional view showing the discharging nozzle and the metal cylinder.

When the beam HB is emitted to the metal cylinder 7, the beam emitted portion is heated and fused. By this fusion (cutting), as shown in FIG. 2, cut potion A, which penetrates through the side wall of the metal cylinder 7, is formed at a part of cut-machined portion of the metal cylinder 7. The machining table moves and the rotary head 5 rotates to relatively move the beam emitted portion along the cut-machined portion. By this, the cut portion A continuously circularly moves along the periphery of the hole 8 to completely form the hole 8.

When the cut portion A is formed on the metal cylinder 7, as denoted by arrows B in FIG. 2, the assist gas flows from the discharge port 10b of the gas discharging nozzle 10 to the outside of the metal cylinder 7 through the cut portion A. The assist gas drifts and sweeps the dross D, which is generated by forming the cut portion A, to the outside of the metal cylinder 7. In this way, the dross D is prevented from sticking to the inner surface of the cut portion A and peripheral area of the cut portion A at the inner surface of the metal cylinder 7.

The dross D drifted and swept toward the outside of the metal cylinder 7 is drifted by the assist gas discharged from the work nozzle 1, from the periphery area to the inside of the cut portion A. The assist gas discharged from the work nozzle 1 flows from the outside to the inside of the beam emitted portion on the surface of the metal cylinder 7. The dross D is, as denoted by arrows C in FIG. 2, blown upwardly by the assist gas flowing out from the gas discharge nozzle 10 to the outside through the cut portion A. As a result, the dross D is prevented from sticking to the outer surface of the metal cylinder 7.

When the cut portion A is formed on the metal cylinder 7, the beam HB emitted from the work nozzle 1 is introduced into the inside of the metal cylinder 7 through the cut portion A. However, in the present embodiment, since the gas discharging nozzle 10 is inserted into the metal cylinder 7 and is positioned on the light axis of the beam HB, the beam HB having passed through the cut portion A is shut by the gas discharging nozzle 10. Thus, the beam HB does not emit the inner surface of the metal cylinder 7. Here, the gas discharging nozzle 10 is made of material which is hardly influenced by the beam HB. For example, in the present embodiment, the gas discharging nozzle 10 is made of copper or brass when YAG laser, of which wave length is 1.064 $\mu$m, is used as the beam HB.

After one hole 8 is formed in this way, for forming next hole 8, the machining table moves horizontally and rotary head 5 rotates, without moving the work nozzle 1 and the gas discharging nozzle 10, that is, without moving the beam HB. By this, a part where the next hole 8 is formed is positioned on a line passing through the work nozzle 1 and the discharge port 10a of the discharging nozzle 10. While the next hole 8 is formed also, the dross is prevented from sticking to the metal cylinder 7 and the beam HB is prevented from emitting the inner surface of the metal cylinder 7, which is opposite to the cut portion A, as described above. Here, even when the number of holes 8 is increased, the assist gas 10 discharged from the gas discharging nozzle 10 is only supplied to the current hole 8 which is under cut-machining procedure. Further, since the peripheral area of the discharge port 10b contacts the inner surface of the metal cylinder 7 and the assist gas does not leak to the inside of the metal cylinder 7, all of the assist gas discharged from the gas discharging nozzle 10 flows out to the outside through the current hole 8. Thus, pressure acting on the dross for drifting and sweeping the dross increases, thereby preventing the dross from sticking with certainty.

(Modifications)

When a plurality of holes having different diameters, diameter of the discharge port 10b of the gas discharging nozzle 10 may be set for the hole having largest diameter, and amount and pressure of the assist gas may be adjusted in accordance with the diameter of the hole being formed.

A sensor may detect pressure or amount of the assist gas flowing out to the outside of the metal cylinder 7 through the cut portion A, and an adjust valve (adjusting means) may adjust pressure and discharge amount of the assist gas from the gas discharging nozzle 10 based on the detection result.

When a large number of holes 8 are formed on the metal cylinder 7, the work nozzle 1 and the gas discharging nozzle 10 may move horizontally, and center axis of the metal cylinder 7 may be rotated, without moving the metal cylinder 7 horizontally, for changing a position where the hole 8 is formed.

Figure 4:
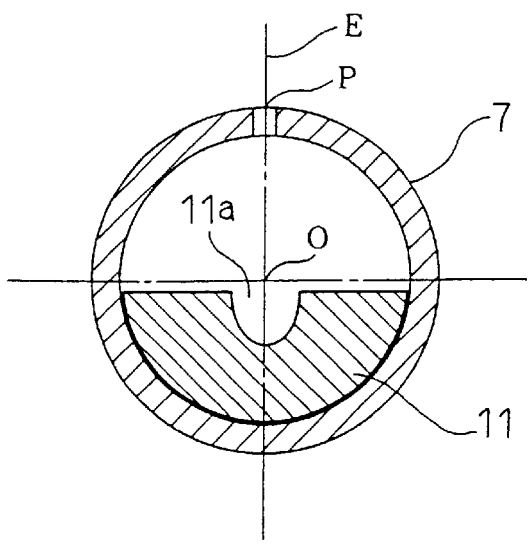
FIG. 4 is a cross-sectional view showing a work nozzle, a metal cylinder and a discharging nozzle (modification)

As shown in FIG. 4, when the work nozzle 1 moves only horizontally for changing a position where the hole 8 is formed on the metal cylinder 7, any position can be formed as long as the position is located at upper half portion of the metal cylinder 7. Here, the gas discharging nozzle 11 is formed in a semicircle and disposed at the lower half portion inside the metal cylinder 7 such that the assist gas is supplied within a range of 180 degrees with respect to a center line E passing through a center P of emission. Thus, as long as the cut-machining is performed at the upper half portion of the metal cylinder 7, the assist gas can be drifted and swept to the outside through the cut-machined position, regardless of the position where the cut-machining is performed. As a result, there is no need to make the discharge port 11a to match the cut-machined position by rotating the gas discharging nozzle 10.

The present invention is not to limited to be used for cylindrical material, and may be used for materials formed in a rectangle, ellipse, or the like, as long as the material has hollow.

Figure 5:
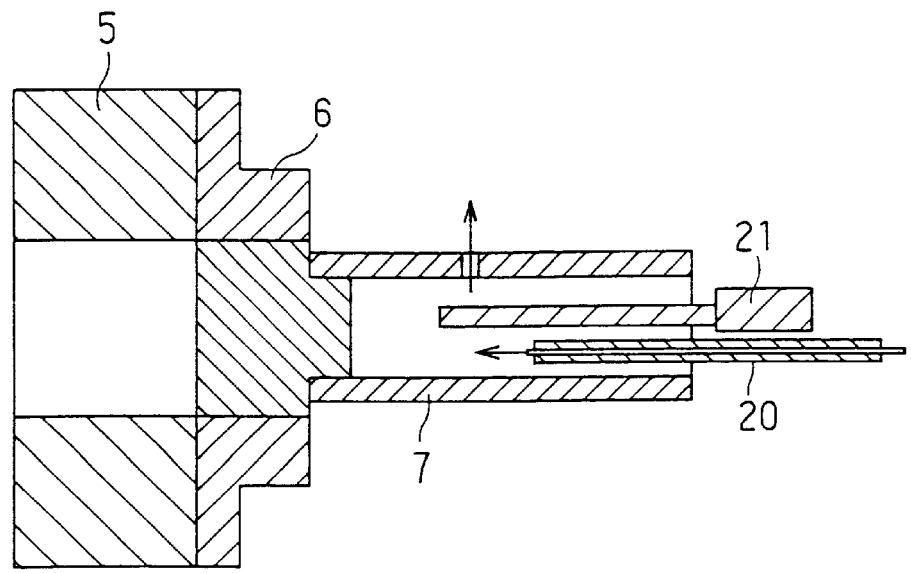
FIG. 5 is a cross-sectional view showing a work nozzle, a metal cylinder, a discharging nozzle, and a shading plate (modification)

In the above described embodiments, the gas discharging nozzle 10 prevents the dross from sticking and shuts the high density energy beam HB. Alternatively, as shown in FIG. 5, a shading plate 21 may be provided additionally to a gas discharging nozzle 20. In this case, when the cut-machining is performed repeatedly to deteriorate the shading plate 21, only the shading plate 21 has to be replaced with new one for maintaining a whole high density energy beam machining apparatus.

Figure 6A:
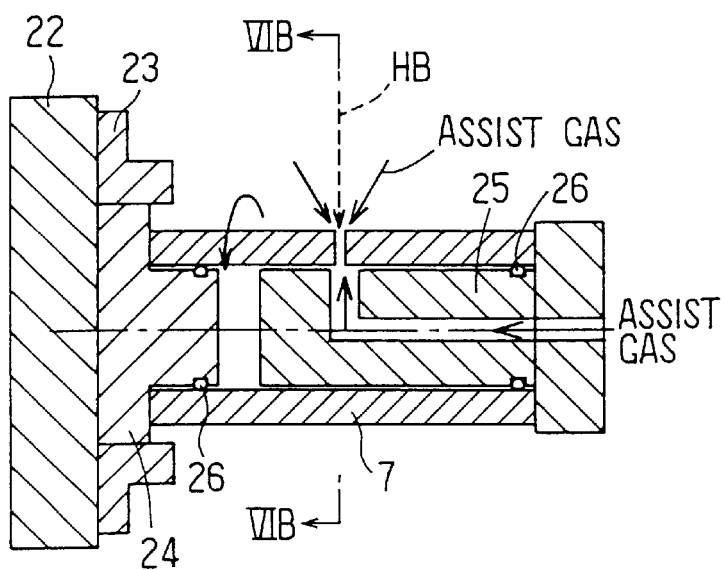
FIG. 6A is a cross-sectional view showing a work nozzle, a metal cylinder and a discharging nozzle (modification)
Figure 6B:
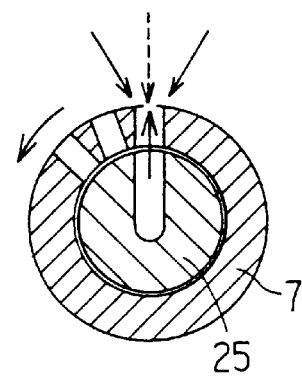
FIG. 6B is a cross-sectional view taken along line VIB—VIB in FIG. 6A.

As shown in FIG. 6, a rotary head 22, a chuck 23, and a holding member 24 having no through hole for supplying the assist gas may be used to hold one end of the metal cylinder 7. A gas discharging nozzle 25 is inserted from the other end into the metal cylinder 7. In this modification, there is no need to form the through holes within the rotary head 22 and the chuck 23, so that normal type rotary head and chuck can be used.

Further, as shown in FIG. 6, O-rings 26 may be provided between the holding member 24 and the metal cylinder 7, and between the gas discharging nozzle 25 and the metal cylinder 7 for preventing pressure reduction of the assist gas.

Figure 7:
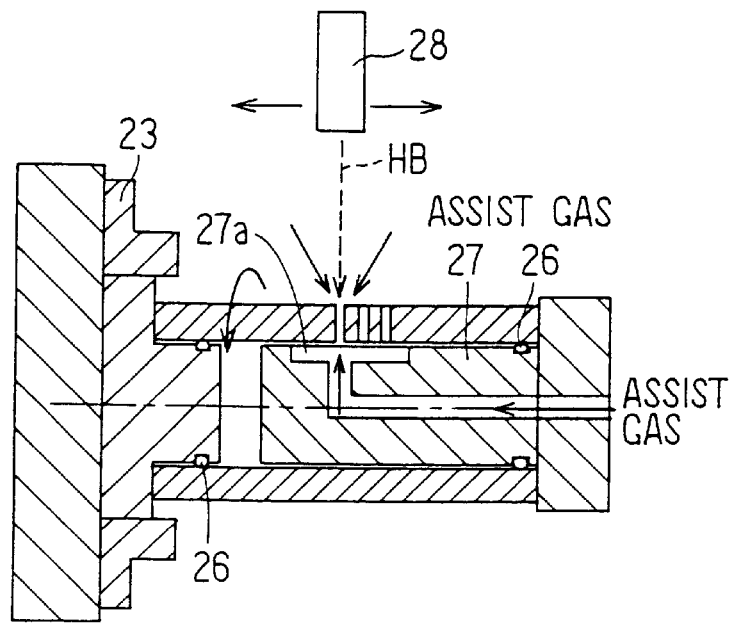
FIG. 7 is a cross-sectional view showing a work nozzle, a metal cylinder and a discharging nozzle (modification)

As shown in FIG. 7, a discharge port 27a of the discharging nozzle 27 may have large width for forming a plurality of holes simultaneously by moving a work nozzle 28 without moving the gas discharging nozzle 27.

Figure 8:
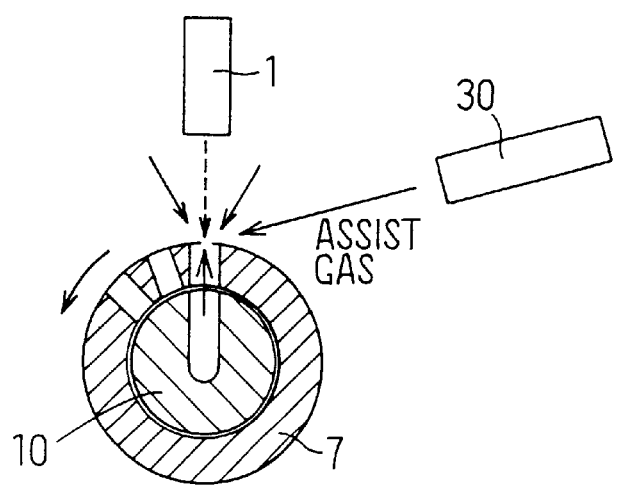
FIG. 8 is a cross-sectional view showing a work nozzle, a metal cylinder and discharging nozzles (modification)
Figure 9:
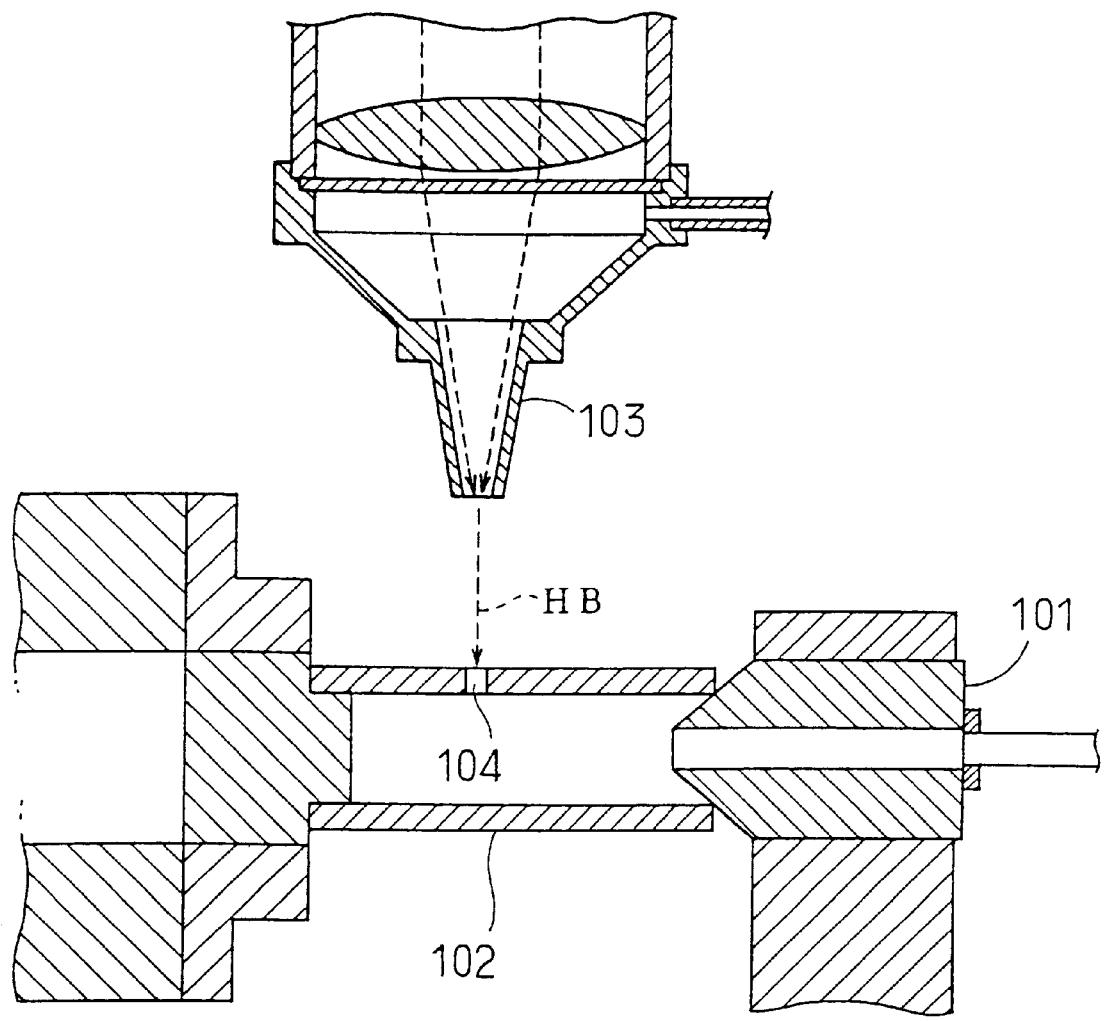
FIG. 9 is a cross-sectional view showing a work nozzle, a metal cylinder and a discharging nozzle for explaining a disadvantage when holes are formed on a metal cylinder by laser beam.

As shown in FIG. 8, a gas discharging nozzle 30 may be provided separately from the work nozzle 1 for supplying the assist gas in the rotating direction of the rotary head. In this modification, the assist gas is strongly supplied in the rotating direction, thereby effectively preventing the dross from sticking to the outer surface of the metal cylinder 7.

What is claimed is:

1. A high density energy beam machining method for emitting a high density energy beam to a work piece having an inside space to perform a cut-machining for allowing the inside space of said work piece to communicate with an outside thereof, comprising the steps of:

emitting the high density energy beam to an emitted portion of said work piece, said emitted portion located at the outside of said work piece;

supplying a first assist gas from the outside of said work piece to said emitted portion;

supplying a second assist gas from an inside of said work piece to said emitted portion; and providing a gas discharging nozzle in the inside space of said work piece for supplying the second assist gas from the inside of said work piece, wherein the first assist gas flows on an outside surface of said work piece around said emitted portion, at least a part of the second assist gas flows to the outside of said work piece through a cut portion formed in said work piece by an emission of the high density energy beam, said gas discharging nozzle shuts the high density energy beam intruding into the inside of said work piece through the cut portion, so that the high density energy beam is not emitted to an inside surface of said work piece, which is opposite to said cut portion.

2. A high density energy beam machining method according to claim 1, wherein said work piece is cylindrically formed, and said gas discharging nozzle supplies the second assist gas within a range of 180 degrees in a circumferential direction of said work piece with respect to a center line passing through a center of the emission and a center of said work piece.

3. A high density energy beam machining method according to claim 1, wherein said gas discharging nozzle supplies the second assist gas only to said cut portion.

4. A high density energy beam machining method according to claim 1, wherein said gas discharging nozzle includes a discharge port, and said discharge port contacts an inside surface of said work piece.

5. A high density energy beam machining method according to claim 1, wherein the high density energy beam is emitted to a desired portion to be cut by moving said work piece without moving the high density energy beam.

6. A high density energy beam machining method according to claim 1, wherein the high density energy beam is emitted to a desired portion to be cut by moving the high density energy beam without moving said work piece.

7. A high density energy beam machining method according to claim 1, wherein amount or pressure of the second assist gas is detected, and the amount or the pressure of the second assist gas is adjusted to be constant amount or constant pressure.

8. A high density energy beam machining method according to claim 1, wherein said work piece is cylindrically formed, and said gas discharging nozzle is formed in a semicircle to supply the second assist gas within a range of 180 degrees in a circumferential direction of said work piece with respect to a center line passing through a center of the emission and a center of said work piece.

9. A high density energy beam machining method according to claim 1, wherein said gas discharging nozzle is made of metal which is hardly influenced by the high density energy beam.

10. A high density energy beam machining method according to claim 1, wherein said gas discharging nozzle is made of copper or brass, and YAG laser, of which wave length is 1.064 μm, is used as the high density energy beam.

11. A high density energy beam machining apparatus for emitting a high density energy beam to a work piece to perform a cut-machining, comprising:

a beam emitting means for emitting the high density energy beam to an emitted portion of said work piece, said emitted portion located at an outside of said work piece;

a first gas supplying means for supplying a first assist gas from an outside of said work piece to said emitted portion; and a second gas supplying means for supplying a second assist gas from an inside of said work piece to said emitted portion, wherein the first assist gas flows on an outside surface of said work piece around said emitted portion, at least a part of the second assist gas flows to the outside of said work piece through a cut portion formed in said work piece by an emission of the high density energy beam, said second gas supplying means includes a gas discharging nozzle provided inside said work piece for supplying the second assist gas from the inside of said work piece, said gas discharging nozzle shuts the high density energy beam intruding into the inside of said work piece through the cut portion, so that the high density energy beam is not emitted to an inside surface of said work piece, which is opposite to said cut portion.

12. A high density energy beam machining apparatus according to claim 11, wherein said gas discharging nozzle supplies the second assist gas only to said cut portion.

13. A high density energy beam machining apparatus according to claim 11, wherein said gas discharging nozzle includes a discharge port, and said discharge port contacts an inside surface of said work piece.

14. A high density energy beam machining apparatus according to claim 11, wherein the high density energy beam is emitted to a desired portion to be cut by moving said work piece without moving the high density energy beam.

15. A high density energy beam machining apparatus according to claim 11, wherein the high density energy beam is emitted to a desired portion to be cut by moving the high density energy beam without moving said work piece.

16. A high density energy beam machining apparatus according to claim 11, wherein amount or pressure of the second assist gas is detected, and the amount or the pressure of the second assist gas is adjusted to be constant amount or constant pressure.

17. A high density energy beam machining apparatus according to claim 11, wherein said gas discharging nozzle is made of metal which is hardly influenced by the high density energy beam.

18. A high density energy beam machining apparatus according to claim 11, wherein said gas discharging nozzle is made of copper or brass, and YAG laser, of which wave length is 1.064 μm, is used as the high density energy beam.

19. A high density energy beam machining method for emitting a high density energy beam to a work piece having an inside space to perform a cut-machining for allowing the inside space of said work piece to communicate with an outside thereof, comprising the steps of:

emitting the high density energy beam to an emitted portion of said work piece, said emitted portion located at the outside of said work piece;

supplying a first assist gas from the outside of said work piece to said emitted portion;

supplying a second assist gas from an inside of said work piece to said emitted portion;

providing a gas discharging nozzle in the inside space of said work piece for supplying the second assist gas from the inside of said work piece; and providing a shading member in the inside space of said work piece, wherein the first assist gas flows on an outside surface of said work piece around said emitted portion, at least a part of the second assist gas flows to the outside of said work piece through a cut portion formed in said work piece by an emission of the high density energy beam, said shading member shuts the high density energy beam intruding into the inside of said work piece through the cut portion, so that the high density energy beam is not emitted to an inside surface of said work piece, which is opposite to said cut portion.

* * * * *